United States Patent Office 2,770,529
Patented Nov. 13, 1956

2,770,529

METHOD FOR PREPARING CHLORINATION FEED MATERIAL

William W. Anderson, Metuchen, and Lancelot W. Rowe, Fords, N. J., assignors to National Lead Company, New York, N. Y., a corporation of New Jersey No Drawing. Application August 24, 1955,
Serial No. 530,406

6 Claims. (Cl. 23—202)

The instant invention presents a procedure by which effective removal of the iron fraction and other gangue diluents from a titaniferous iron material may be carried out. More specifically, it is concerned with treating titaniferous iron materials to prepare a titanium-bearing product that is readily amenable to chlorination.

In commercial practices outside the pigment industry, the use of high grade titanium oxide material has become increasingly important, particularly where these materials may be used in preparing other compounds of titanium. For example, natural rutile, which has a high titanium content and a low percentage of iron and other gangue diluents, has been in large demand because it can be chlorinated in the presence of a carbonaceous reducing agent to produce large volumes of titanium tetrachloride at high recovery efficiencies. For various reasons, largely procedural and economical, it is desirable to replace or at least augment the supplies of natural rutile used in producing titanium tetrachloride by employing the more abundant quantities of titanium values available in titaniferous iron materials. In this connection, previous methods for beneficiating low-grade titaniferous iron materials have had to contend with the problem of obtaining intimate contact between the titanium oxide and carbon particles since these materials tend to segregate out of the mixture during handling and during the chlorination reaction. Many attempts have been made to overcome this difficulty and perhaps the most effective method to date is that of pelletizing the mixture in the presence of a binder (e. g. tar, molasses, or the like). However, intimate contact of the titanium oxide and carbon particles is difficult to achieve and even blending the materials for extended periods does not insure a homogeneous pelletized product. Accordingly, it is highly desirable to develop a beneficiation procedure for titaniferous iron materials involving essentially a single stage operation capable of producing a material which can be chlorinated directly without further treatment.

The ores from which titanium is obtained generally contain other metal compounds, and in particular compounds of iron, which from the standpoint of recovering the titanium values are regarded as impurities. One method of separating the iron fraction from the titanium values is to smelt the titaniferous iron material with coke and fluxes in an electric furnace to form metallic iron and a titanium slag from which the metallic iron is removed by liquation, magnetic separation, leaching and similar well-known techniques. However, utilization of the titanium-bearing slag for titanium tetrachloride production has been found undesirable for several reasons, principally because relatively high temperatures are required to carry out the smelting and because the fluxes remain in the slag. In this connection, the fluxes (1) often participate in the chloridizing reaction and contaminate the titanium tetrachloride product; (2) cause operational difficulties such as stopping the chloridizing reaction, plugging of lines in the chlorination and distillation apparatus, etc.; (3) dilute the titanium slag and thereby reduce the titanium output per chlorinator per unit of feed material charged; and (4) are undesirable since they must be disposed of in some step of the process.

An object therefore of this invention is to provide an improved method for treating titaniferous iron materials.

Another object of the invention is to provide an improved, single-stage method for producing a highly reactive feed material for use in the manufacture of titanium tetrachloride.

A further object is to provide an improved method for beneficiating titaniferous iron materials by selectively separating the titanium values from the iron fraction and other gangue diluents.

A still further object of the invention is to provide a process for preparing a chlorination feed material rich in titanium values which is amenable to chlorination at low temperatures without addition of supplementary carbonaceous reducing agents to produce titanium tetrachloride.

It is also an object of this invention to provide a method for producing a chlorination feed material in which titanium values are deposited on and in intimate association with a solid carbonaceous reducing agent.

Other objects and advantages of the present invention will become apparent from the following more complete description which illustrates the novel process by which a titaniferous chlorination feed material is obtained from a titaniferous iron material.

The present invention, broadly stated, relates to a method for preparing, in essentially a one-step operation, a coalesced mixture of substantially iron-free titanium oxide and solid carbonaceous reducing agent by reacting under pressure a titaniferous iron material, a carbonaceous reducing agent, and sulfuric acid for sufficient time to produce solubilized gangue fraction, including iron, and an insoluble mixture of the carbonaceous reducing agent and titanium oxide values. Thereafter, the solution containing the solubilized gangue and iron fractions is readily separated from the insoluble mixture of carbonaceous reducing agent and titanium values, the latter insoluble mixture sometimes being referred to hereinafter as a "hydrated titanium oxide-carbon mixture."

The titaniferous iron materials contemplated for treatment by the present process shall be understood to include titaniferous iron ores and like materials, such as massive rock deposits and beach sands which have been chemically or physically treated to produce titaniferous concentrates, slags and similar titanium materials containing iron.

As used herein, the term "directly convert" shall be understood to mean that the instant process is characterized by a single stage conversion of the titanium values in the titaniferous iron materials to substantially iron-free, relatively insoluble hydrated titanium oxide without necessitating a separate hydrolysis step. By the single stage conversion method of the instant invention, it will be found that the titanium values in the titaniferous iron material are not retained as soluble titanium sulfate since the titanium values will not remain in solution under the conditions of temperature and pressure at which the process is carried out. Insoluble titanium values are obtained directly by pressure treating the titaniferous iron material in the presence of the acid and hence it is not necessary to resort to separate hydrolysis of the titanium values.

The term "carbonaceous reducing agent" shall have reference herein to any suitable carbonaceous material, preferably a solid material such as metallurgical coke or petroleum coke. In the interest of brevity the carbonaceous reducing agent sometimes may be referred to hereinafter as coke although it will be understood that other solid carbonaceous reducing agents may be employed in the method of the present invention.

As indicated above, the requisites for an economical highly productive feed material for use in the manufacture of titanium tetrachloride are that it shall be substantially free of iron, fluxing agents and other diluents, that is have a high concentration of titanium values, and that the ratio of oxygen to carbon be nearly stoichiometric so as to preclude any need for the addition of carbon during chlorination of the feed material.

The great measure of success of the present invention may be attributed to the discovery that by treating a titaniferous iron material in the presence of an excess carbonaceous reducing agent while reacting the constituents at pressures between from about 100 p. s. i. to about 2000 p. s. i., a hydrated titanium oxide-carbon mixture is obtained containing less than about 5% iron and greatly decreased amounts of other gangue constituents originally present in the titaniferous iron material. More specifically, by employing the novel pressure leaching technique of the present invention, the titanium oxide values from the titaniferous iron materials are quantitatively deposited on the coke during the leaching stage. Apparently, at the pressures used, the fine titanium oxide particles (about 0.1-0.5 micron size), or at least a portion of the particles, are forced into the interstices of the carbonaceous reducing agent. This effect is noted especially if a porous reducing agent such as coke is used. At the same time, it will be found that some of the titanium oxide values are distributed evenly over the surface of the coke and are in intimate contact therewith, the overall result being a homogeneous titanium oxide-carbon product which is very reactive in the presence of chlorine at temperatures as low as about 400° C. Other advantages realized by the novel procedure of this invention are: (1) addition of coke during the leaching eliminates any need for adding special reducing agents during chlorination to convert ferric iron values to ferrous iron values since the small amount of iron values in the pressure leached material are present in the ferrous state, (2) agitation of the reaction mass in the pressure vessel permits thorough blending of the reaction products, (3) the operating cycle is relatively short since the reaction proceeds fairly rapidly under the conditions stated herein, (4) contaminants which are normally present in a titaniferous iron material and interfere with chlorination of titanium values are removed or at least removed to the point where they are not harmful during chlorination, and (5) it is possible to chlorinate the product produced by the method of this invention very efficiently and without briquetting because of the intimate bond between the titanium values and carbonaceous reducing agent.

To achieve the objects of the present invention, titaniferous iron material, such as ilmenite, having a particle size preferably less than about 20 mesh is mixed with sulfuric acid, and a carbonaceous reducing agent in such a manner as to form a slurry. The mass is then heated in a pressure vessel, such as an autoclave, for a period of time and under pressure of from about 100 p. s. i. to about 2000 p. s. i. to solubilize all of the iron values present in the titaniferous feed material. At the same time, it will be found that a major proportion of other gangue constituents present in the titaniferous iron material will be solubilized along with the iron values. Within the range of pressure at which it has been found desirable to operate, it has been observed that substantially 98% of the iron may be removed without substantial loss of titanium values, such complete iron removal being highly desirable in obtaining a chlorination feed material that will chloridize without difficulty.

While all of the reactions that take place within the pressure vessel are not known, it is postulated that by reacting a mixture of titaniferous iron material, sulfuric acid and reducing agent, all of the iron in the titaniferous iron material is converted to a soluble ferrous state and the titanium values "precipitate" on the coke to form an intimate, coalesced hydrated titanium oxide-coke product.

To prepare a readily chlorinatable feed material by the process of this invention it is necessary to have sufficient carbonaceous reducing agent present in the hydrated titanium oxide-carbon mixture so that no additional carbon will be required during chlorination of the mixture. At the same time enough carbonaceous reducing agent should be present to reduce all of the ferric iron in the titaniferous iron material to the soluble ferrous iron state. In the overall picture, therefore, it will be found that the addition of 20 to 35% finely divided carbon (based upon the amount of $TiO_2$ in the titaniferous iron material) will give essentially complete dissolution of the iron fractions originally present in the ore while at the same time effecting a completely homogenous mixture of the carbon-hydrated titanium oxide values. As pointed out above, any carbonaceous reducing agent such as carbon, coke or the like may be added to the titaniferous iron material to be treated. The amount of reducing agent employed, however, may be influenced by the presence or absence of various oxidizing agents other than those already mentioned. Excess quantities of reducing materials may be employed but they may cause a corresponding increase in the required amount of sulfuric acid necessary to produce an efficient slurry and consequently, it is preferred to avoid amounts of coke in any great excess. The particle size of the coke should preferably be less than about 20 mesh in order to obtain adequate surface area for deposition of the titanium values thereon. Larger particle size coke may be used but the larger material must be added in larger quantities to get adequate surface area and efficient reaction during the leaching.

In order to realize most efficient results, leaching should be carried out at pressures of from about 100 p. s. i. to 2000 p. s. i., and preferably within the range 500–1000 p. s. i. In general, the use of high pressure, that is, above 2000 p. s. i. is to be avoided since obvious disadvantages result. At pressures above 3000 p. s. i. the water present during leaching may begin to convert to steam, and acid concentration may increase such that greater solubilization of the titanium values begins to take place. Also, some of the iron which has already gone into solution may precipitate out and remain behind to contaminate the hydrated titanium oxide-carbon product when pressure is removed from the system. Also, when excessively high pressures are employed, the problems of materials of construction and size of apparatus become unduly magnified.

In order to bring about maximum iron removal with minimum loss of titanium values in a minimum period of leaching, it is only necessary to heat the pressure vessel in which the reaction takes place to temperatures between about 150° C. and 350° C. This temperature range achieves the operating pressures required according to the method of the instant invention, i. e. within the range of from about 100 to about 2000 p. s. i.

The optimum amount of sulfuric acid required to obtain maximum iron removal with minimum loss of titanium varies with the composition of the titaniferous iron materials to be treated. Obviously, sufficient sulfuric acid should be present during the pressure leaching step to at least theoretically react with all of the ferrous iron values present after reduction of the ferric iron of the titaniferous iron material to ferrous iron. Thus, it can be shown that with a greater amount of total iron content in the starting material, it is necessary to proportionately increase the amount of sulfuric acid employed. For example, a titaniferous iron material such as an ilmenite-magnetite ore containing 43% iron (calculated on an FeO basis) requires about 60 parts of $H_2SO_4$ per 100 parts of ore to convert all of the ferrous iron fraction to soluble ferrous sulfate, whereas an ilmenite ore containing only 32% iron (calculated on an FeO basis) requires only about 44 parts $H_2SO_4$ per 100 parts of ilmenite. When subjecting a titaniferous iron material to the reaction of sulfuric acid, however, it is preferred to have excess sulfuric acid solution present to provide a workable slurry during and after reaction in order that the reaction mass may be easily removed from the pressure vessel and the iron and gangue constituents separated from the carbon-hydrated titanium oxide product. At least sufficient sulfuric acid liquor is added to react with all of the iron, calcium oxide and magnesium oxide fractions present in the ore. To this end, however, it is preferred to add from about 25% to about 100% excess acid over that theoretically required to react with all of the above-mentioned gangue constituents in the titaniferous iron material, since the excess acid permits obtention of a slurry of the leached mass as distinguished from a cake-like reaction mass, the latter being undesirable in carrying out the actual mechanics of the process.

It is not necessary that the sulfuric acid employed be highly concentrated and it has been found desirable to add sulfuric acid solutions containing from about 15% to about 50% $H_2SO_4$. Convenient and economical sources of such solutions are acid pickling liquors and the waste acids recovered from the sulfate process for producing $TiO_2$ pigment.

When employing a sulfuric acid solution containing about 15% $H_2SO_4$ it is desirable to utilize sufficient liquor to react with all of the iron, calcium and magnesium values in the ore plus a 25% excess; with a 50% acid solution, a 100% excess is most desirably employed. The major reason for use of the excess acid values is to provide a workable slurry and to prevent precipitation of ferrous sulfate values from solution.

When an acid solution containing greater than 50% $H_2SO_4$ is employed it will be found that greater solubilization of titanium values takes place with attendant decrease of titanium recovery in the final product. Further, acid concentrations above 50% $H_2SO_4$ may result in less iron removal and the titanium-carbon product may set up in a solid, cake-like mass. While it is true that sulfuric acid concentration greater than 50% $H_2SO_4$ may be used, it is to be realized that certain disadvantages result from using such high acid concentration.

An acid concentration of less than 15% $H_2SO_4$ may be employed (e. g. as low as about 6% $H_2SO_4$ solution) especially where a titaniferous iron material is relatively low in total gangue constituents, especially iron. However, when a large amount of iron is present, it becomes necessary to employ large quantities of these relatively dilute acid solutions in order to have sufficient sulfuric acid present to react with all of the ferrous iron plus calcium and magnesium oxide fractions. This is undesirable from the standpoint of equipment size and ordinarily is to be avoided in a commercial scale operation.

To achieve effective solubilization of the iron and other gangue constituents in the titaniferous iron material, the particle size of the ore or concentrate preferably should be not larger than about 20 mesh. Particle sizes larger than 20 mesh do not permit as complete iron removal, though iron removal from the coarser particle size material can be improved by prolonged periods of treatment in the pressure vessel. Therefore, as is to be expected, the iron values and other gangue constituents are more readily and completely solubilized as the particle size of the feed material decreases. For example, a 100% minus 20 mesh ilmenite feed material may contain as high as about 8.0% iron in the final product, whereas the same ilmenite, ground to 100% minus 200 mesh and treated under similar conditions, will be found to produce a product containing only about 0.5% iron.

The product which results from treating a titaniferous iron material according to the method of the instant invention is particularly adaptable as a feed material in the production of titanium chloride. After reacting the slurry in the pressure vessel for sufficient time to leach out substantially all of the iron values and most of the other gangue constituents, the pressure is released in the vessel and the slurry is removed from the autoclave, filtered, and washed and the hydrated titanium oxide-coke mixture may be carried through a repulping step, if desired. The hydrated titanium oxide-carbon mixture, having been separated by filtration from the solubilized gangue constituents, including iron, is then dried and may be fed directly to a chloridizing apparatus. Depending upon the type of titaniferous iron material treated by the method of the instant invention said titanium oxide-carbon mixture will be found to contain from about 50% to about 70% $TiO_2$, from about 0.5% to about 10% iron, from about 25 to about 40% carbon, and no more than about 2% total sulfate. This product may be readily chlorinated at temperatures as low as about 400 to 700° C.

In order to more fully illustrate the preferred embodiments of this invention the following examples are given:

Example I

To 1000 parts of minus 200 mesh titaniferous iron material having an analysis of 46.0% $TiO_2$, 38.0% FeO, 5.0% $Fe_2O_3$, 1.0% CaO, 3.5% MgO, was added 1220 parts of a 50% sulfuric acid solution and 150 parts carbon (as coke) to produce a slurry. This slurry was added to an autoclave and subjected to a pressure of 500 p. s. i. for a period of 15 minutes. During the reaction period the slurry was agitated to provide a high degree of contact between the ore particles and other reactants. The reacted slurry mass was then removed from the autoclave, filtered and washed to remove the solubilized constituents, especially iron. The hydrated titanium oxide-coke residue, after drying and weighing was found to contain 60.6% $TiO_2$, only 0.9% total iron, 0.1% CaO and 0.05% MgO. The loss of titanium by solubilization in the acid solution and in handling was calculated to be substantially less than 1.5%. The dried mixture of titanium oxide and carbon was then charged directly into a chlorination apparatus and heated to a temperature within the range 500 to 800° C. Chlorine was passed through the charge at a rate of from about 0.15 to 0.20 ft. per second. Dust losses were calculated to be only about 5.0%. The reaction was continued until the appearance of significant free chlorine losses indicated a spent bed at which time the residue was discharged from the chlorinator with no evidence of sintering. Since most of the magnesium oxide values had been removed by the leaching step, only trace amounts of $MgCl_2$ were formed.

Conversion of the titanium oxide values to titanium tetrachloride was calculated to be about 92 to 97% complete and chlorine utilization was 90 to 92%, chief chlorine losses showing up as fixed chlorines in the residue. The residue consisted mostly of fine carbon which could be readily removed from the intermediate size gangue constituents in the residue by a hydroseparation step and returned to the process.

During the chlorination it was observed that the titanium tetrachloride was essentially water white in appearance and relatively free of impurities, which was highly indicative of selective chlorination of the $TiO_2$ values.

Example II 1000 parts of the titaniferous iron material used in Example I was treated in the same manner as described in Example I except that a 23% $H_2SO_4$ solution was employed. The slurry was then heated in an autoclave to a pressure of 500 p. s. i. for a period of 60 minutes. After the solubilized gangue constituents, including iron, were filtered off and the hydrated titanium oxide-coke residue was washed and dried, the residue was analyzed and found to contain 54.6% $TiO_2$ and only 6.1% total iron, 0.1% CaO and 0.5% MgO. The iron removal was calculated to be 88% and the titanium loss was less than 1.5%. As in the previous example the $TiO_2$-carbon product was treated with chlorine in a chlorinator with essentially the same results as shown in Example I.

*Example III*

To 1000 parts of an ilmenite beach sand of minus 200 mesh particle size and analyzed as containing 59.5% $TiO_2$, 9.5% FeO and 25.2% $Fe_2O_3$ was added 1100 parts of a 50% $H_2SO_4$ solution and 210 parts carbon. The slurry mixture was then heated in a autoclave to a pressure of about 500 p. s. i. for a period of 30 minutes and thereafter the reacted mass was removed from the autoclave, filtered and washed to remove the solubilized iron values. The hydrated $TiO_2$-coke residue was dried, weighed, analyzed and found to contain 69.1% $TiO_2$, 1.2% total iron, 0.1% CaO and 0.01% MgO, the iron removal being calculated to be 96.2% and the titanium loss only about 2.0%. The highly coalesced $TiO_2$-carbon product was then chlorinated by the procedure described in Example I and similar results to that shown in Example I were obtained.

*Example IV*

1000 parts of an ilmenite-magnetite ore having an analysis of 46.0% $TiO_2$, 38.0% FeO, 5.0% $Fe_2O_3$, 1.0% CaO, 3.5% MgO were added to 1030 parts of a 35% $H_2SO_4$ solution and 125 parts carbon. The slurry thus obtained was pressure leached by a procedure similar to that described in Example I to obtain a product similar in properties to that described in Example I. The resulting $TiO_2$-carbon mixture was then chlorinated by a procedure similar to that of Example I and results similar to those described in Example I were obtained.

In summary, the improved method of this invention for treating titaniferous iron materials is characterized by the production of an easy chlorinatable titanium oxide-carbon product substantially free of iron. The process is further characterized by the fact that it results in a highly reactive feed material for use in the manufacture of titanium tetrachloride at relatively low temperatures and without the addition of supplementary carbonaceous reducing agents to carry out the chlorination reaction. Furthermore, it has been shown by the description above that it is possible to treat titaniferous iron materials which vary in their proportions of iron and titanium in an economical and single stage operation, and such that the iron content in the titaniferous iron material is easily separated from the titanium content therein.

Although this invention has been described and illustrated by the examples shown, it is not intended to be strictly limited thereto and other modifications and variations may be employed within the limits of the following claims:

We claim:

1. A single stage process for preparing a chlorination feed material by directly converting the titanium values in a titaniferous iron material to a substantially iron-free titanium oxide material in the presence of a carbonaceous reducing agent which comprises: admixing a titaniferous iron material, a carbonaceous reducing agent and sulfuric acid to form a slurry; heating said slurry in a pressure vessel while maintaining the pressure within said vessel in the range of from about 100 p. s. i. to about 2000 p. s. i. for a period of time sufficient to solubilize the calcium, magnesium and iron constituents of said titaniferous material and precipitate the titanium values in the presence of the carbonaceous reducing agent in the form of a coalesced substantially iron-free relatively insoluble, hydrated titanium oxide-carbon material; said carbonaceous reducing agent being present in an amount of at least 20% based upon the amount of titanium dioxide in the titaniferous iron material; said sulfuric acid being present in an amount sufficient to solubilize substantially all of the calcium, magnesium and iron constituents in the titaniferous iron material; and thereafter separating said solubilized constituents and gangue from said insoluble hydrated titanium oxide-carbon material.

2. A single stage process for preparing a chlorination feed material by directly converting the titanium values in a titaniferous iron material to a substantially iron-free titanium oxide material in the presence of a carbonaceous reducing agent which comprises: admixing a titaniferous iron material, a carbonaceous reducing agent and sulfuric acid to form a slurry; heating said slurry in a pressure vessel while maintaining the pressure within said vessel in the range of from about 100 p. s. i. to about 2000 p. s. i. for a period of time sufficient to solubilize the calcium, magnesium and iron constituents of said titaniferous material and precipitate the titanium values in the presence of the carbonaceous reducing agent in the form of a coalesced substantially iron-free relatively insoluble, hydrated titanium oxide-carbon material; said carbonaceous reducing agent being present in an amount of at least 20% based upon the amount of titanium dioxide in the titaniferous iron material; the concentration of said sulfuric acid being from about 15% to about 50% $H_2SO_4$ and the amount of said acid being substantially in excess of the amount required to react theoretically with all of the calcium, magnesium and iron constituents in the titaniferous iron material; and thereafter separating said solubilized constituents and gangue from said insoluble hydrated titanium oxide-carbon material.

3. Method according to claim 2 wherein said carbonaceous reducing material comprises from about 20 to about 35% carbon.

4. Method according to claim 2 wherein said pressure is in the range of from about 500 p. s. i. to about 1000 p. s. i.

5. Method according to claim 2 wherein said titaniferous iron material is ilmenite.

6. Method according to claim 2 wherein said titaniferous iron material is an ilmenite-magnetite.

No references cited.